US012621070B2

(12) United States Patent
    Riedel et al.

(10) Patent No.: US 12,621,070 B2
(45) Date of Patent: May 5, 2026

(54) SYSTEM AND METHOD FOR COORDINATING A TRANSITION OF A TRANSMISSION STREAM

(71) Applicant: Viacom International Inc., New York, NY (US)

(72) Inventors: Gregg William Riedel, New York, NY (US); Jeff Hess, New York, NY (US); Christopher Fulton Hundersmarck, New York, NY (US)

(73) Assignee: Viacom International Inc., New York, NY (US)

( * ) Notice: Subject to any disclaimer, the term of this patent is extended or adjusted under 35 U.S.C. 154(b) by 0 days.

(21) Appl. No.: 18/647,282

(22) Filed: Apr. 26, 2024

(65) Prior Publication Data

US 2025/0337512 A1 Oct. 30, 2025

(51) Int. Cl.
    *H04H 60/06* (2008.01)
    *H04Q 11/00* (2006.01)

(52) U.S. Cl.
    CPC ............. *H04H 60/06* (2013.01); *H04Q 11/00* (2013.01)

(58) Field of Classification Search
    CPC ........... H04N 21/26283; H04N 21/278; H04N 21/485; H04N 21/482; H04N 21/47214
    See application file for complete search history.

(56) References Cited

U.S. PATENT DOCUMENTS

| | | | | |
|---|---|---|---|---|
| 6,477,707 B1* | 11/2002 | King | ...................... | H04N 21/23 |
| | | | | 725/147 |
| 6,481,011 B1* | 11/2002 | Lemmons | .......... | H04N 21/4858 |
| | | | | 725/47 |
| 7,665,117 B2* | 2/2010 | Sequeira | .............. | H04N 21/435 |
| | | | | 725/116 |
| 2002/0056103 A1* | 5/2002 | Gong | ................... | H04N 21/435 |
| | | | | 725/39 |
| 2016/0021419 A1* | 1/2016 | Caldwell | ............ | H04N 21/2407 |
| | | | | 725/22 |

* cited by examiner

*Primary Examiner* — Jason Salce
(74) *Attorney, Agent, or Firm* — Fay Kaplun & Marcin, LLP

(57) ABSTRACT

A system includes Memory, Display and Processor. Memory stores application with executable instructions. Processor performs operations: retrieving schedule information for channels to be transmitted simultaneously by a broadcaster, the information includes start and end times for types of content to be transmitted; identifying, from the information, first time segments in which a first content type is to be transmitted and second time segments in which the first type is not to be transmitted; displaying a plot of the information with content types transmitted over time for each of the channels, the first segments corresponding to the first type are displayed as a first color and the second segments are displayed as a second color; identifying, from the second segments for each channel, transition windows comprising durations within which all of channels are scheduled to not transmit the first type; and overlaying on the plot an indicator of the windows.

19 Claims, 8 Drawing Sheets

Diagram
100

Satellite
110

Uplink Signal
108

Satellite Uplink
106

Multiplex
104

Channels 1-7
102

Map
200

206  Satellite

202

Primary
Uplink

204

Alternate
Uplink

Schedule
300

| | |
|---|---|
| 8:00:00pm | Program segment 1 (15 minutes) |
| 8:15:00pm | Bumper out (3 seconds) |
| 8:15:33pm | Commercial 1 (30 seconds) |
| 8:16:03pm | Commercial 2 (30 seconds) |
| 8:16:33pm | Promo (30 seconds) |
| 8:17:03pm | Commercial 3 (30 seconds) |
| 8:17:33pm | Commercial 4 (30 seconds) |
| 8:18:03pm | Bumper in (3 seconds) |
| 8:18:06pm | Program segment 2 (15 minutes) |

...

Schedule
350

Program segments          Commercial blocks
352                              354

Method
400

Display Portion
530

Multiplex selection
510

Dropdown menu
512

Display Portion
530

Multiplex selection
510

Channels
514

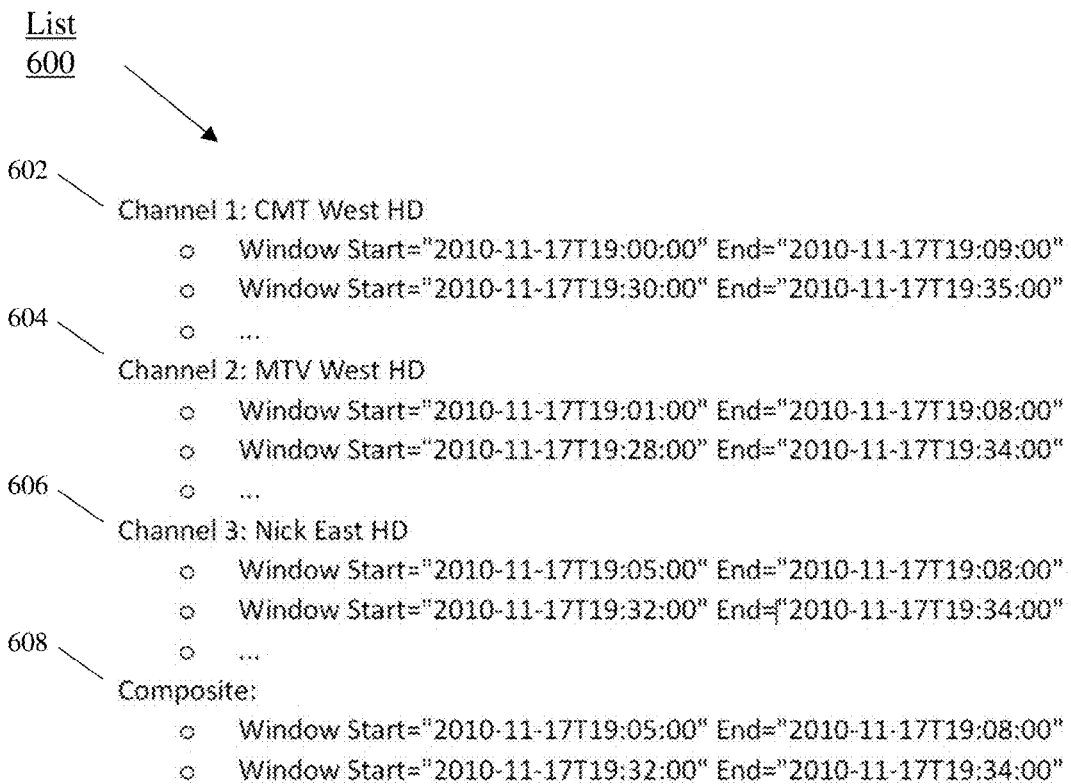

List
600

602
Channel 1: CMT West HD
    o    Window Start="2010-11-17T19:00:00" End="2010-11-17T19:09:00"
    o    Window Start="2010-11-17T19:30:00" End="2010-11-17T19:35:00"
604    o    ...
Channel 2: MTV West HD
    o    Window Start="2010-11-17T19:01:00" End="2010-11-17T19:08:00"
    o    Window Start="2010-11-17T19:28:00" End="2010-11-17T19:34:00"
606    o    ...
Channel 3: Nick East HD
    o    Window Start="2010-11-17T19:05:00" End="2010-11-17T19:08:00"
    o    Window Start="2010-11-17T19:32:00" End="2010-11-17T19:34:00"
608    o    ...
Composite:
    o    Window Start="2010-11-17T19:05:00" End="2010-11-17T19:08:00"
    o    Window Start="2010-11-17T19:32:00" End="2010-11-17T19:34:00"

Fig. 6

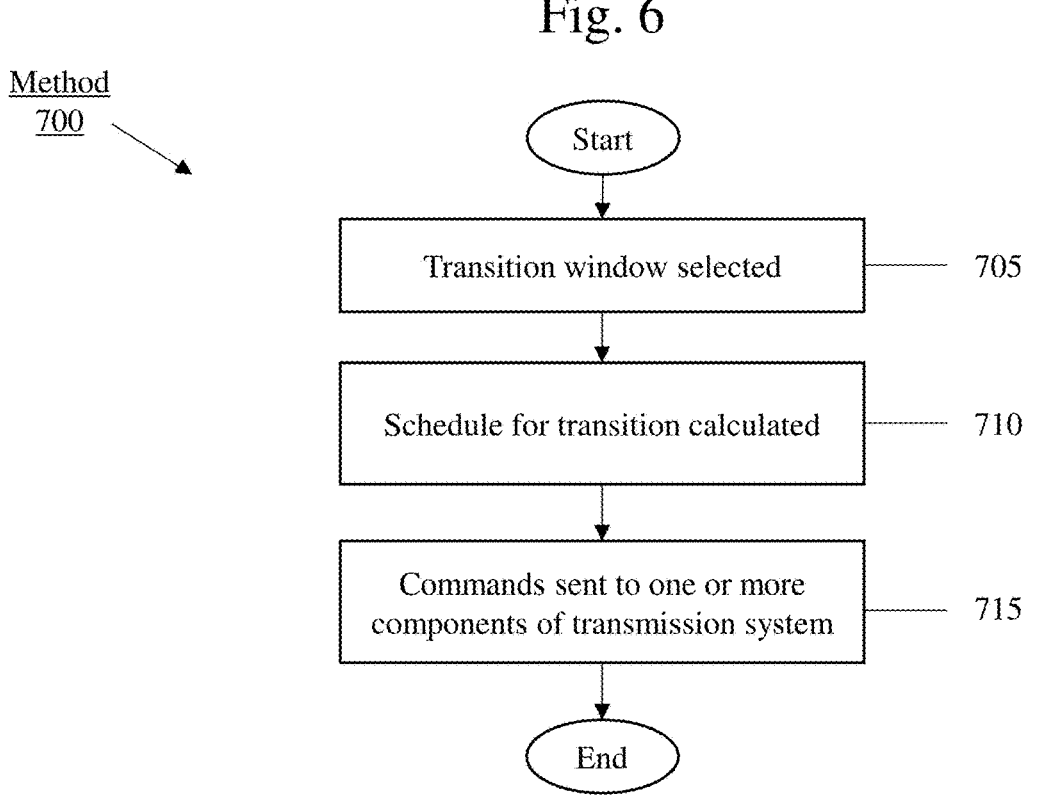

Method
700

Start

Transition window selected — 705

Schedule for transition calculated — 710

Commands sent to one or more components of transmission system — 715

End

Fig. 7

System
800

SYSTEM AND METHOD FOR COORDINATING A TRANSITION OF A TRANSMISSION STREAM

BACKGROUND

As would be understood by those skilled in the art, multiple channels can be transmitted simultaneously from a transmission site to a satellite for broadcasting. The transmission site may include, for example, a chain of equipment referred to as a satellite uplink that transmits an uplink signal to the satellite. Under certain conditions, a satellite uplink may be temporarily unable to transmit a high-quality uplink signal. For example, the satellite uplink may need to be powered down due for routine maintenance, inclement weather may interrupt the signal, equipment may fail, etc.

Accordingly, broadcasters often implement a redundant system including a primary uplink located at a first transmission site and an alternate uplink located at a second transmission site geographically separated from the first transmission site. When the primary uplink is unable to transmit the channels (or when it is anticipated that the primary uplink will be unable to transmit in the near future), the broadcaster can switch from the primary uplink to the alternate uplink so that the alternate uplink can transmit the same channels and broadcast will not be interrupted during the time for which the primary uplink is unavailable. When the primary uplink is again able to transmit, the broadcaster can switch back to the primary uplink. This may occur periodically, e.g., multiple times per year due to routine maintenance, and/or frequently over a relatively short duration due to unforeseeable conditions.

Contractual regulations forbid broadcasters from transmitting the same uplink signal simultaneously from multiple transmission sites (referred to as "dual illumination"). Accordingly, when switching from a first transmission site to a second transmission site, there is always a brief, coordinated dropout in the broadcast of the channel or channels carried in that uplink signal. This dropout can incur negative effects to the broadcaster. In one example, if a commercial is scheduled to air on one of the channels when the dropout occurs, the broadcaster may not be paid for airing the commercial.

SUMMARY

The present disclosure relates to a system which includes a memory storing an application comprising executable instructions for calculating a transition window and providing a graphical user interface (GUI), the memory further storing configuration information for the application. The system also includes a display configured to display the GUI and receive user input and a processor.

The processor is configured to perform the following operations: retrieving schedule information for a plurality of channels to be transmitted simultaneously by a broadcaster, the schedule information comprising start times and end times for types of content to be transmitted; identifying, from the schedule information, first segments of time in which a first type of content is to be transmitted and second segments of time in which the first type of content is not to be transmitted; displaying, on the display, a plot of the schedule information for the plurality of channels, the plot including the types of content to be transmitted over time for each of the plurality of channels, wherein the first segments corresponding to the first type of content are displayed as a first color and the second segments are displayed as a second color; identifying, from the second segments of time for each channel, one or more transition windows comprising durations within which all of the plurality of channels are scheduled to not transmit the first type of content; and overlaying on the plot an indicator of the one or more transition windows.

In an embodiment, the configuration information includes a lookahead window defining a duration of time within which the one or more transition windows are identified, wherein the schedule information is retrieved for the plurality of channels for the duration corresponding to the lookahead window.

In an embodiment, the configuration information includes a minimum transition window size comprising a minimum duration and wherein the indicator of the one or more transition windows overlaid on the plot comprise only those transition windows comprising the minimum duration.

In an embodiment, the processor is configured to perform further operations comprising: receiving, via the GUI, a selection of a multiplex from a list of multiplexes, the multiplex being associated with the plurality of channels; and displaying, via the GUI, a list of the channels.

In an embodiment, the first type of content comprises commercial content such that the one or more transition windows are calculated for durations within which all of the plurality of channels are scheduled to not transmit the commercial content.

In an embodiment, the processor is configured to perform further operations comprising: receiving, via the GUI, a selection of a first indicator of a first transition window; and displaying, via the GUI, information for the first transition window including a start time, an end time and a duration of the first transition window.

In an embodiment, the processor is configured to perform further operations comprising: receiving, via the GUI, a selection of a first channel of the plurality of channels to exclude from consideration when identifying the transition windows; and recalculating the transition windows without considering the first channel.

In an embodiment, the indicator of the one or more transition windows comprises, for each transition window, a bar overlaid on the plot of the schedule information having a thickness corresponding to the duration of the transition window.

In addition, the present disclosure relates to a display comprising a graphical user interface (GUI) of an application for calculating a transition window. The display includes: a multiplex selection field comprising a drop-down menu for selecting one of multiple multiplexes comprising a plurality of channels to be transmitted simultaneously by a broadcaster; a list of channels included in a selected multiplex; a plot of schedules over time for the list of channels; and one or more indicators of transition windows overlaid on the plot across each of the channels in the plot, each transition window being selectable such that detailed information for the transition window is displayed.

In an embodiment, via the GUI, a user selects a multiplex from the drop-down menu so that the application retrieves schedule information for the plurality of channels included in the multiplex.

In an embodiment, the schedule information is retrieved for a duration of time corresponding to a lookahead window included in configuration information for the application, wherein the plot of schedules over time corresponds to the lookahead window.

In an embodiment, the one or more indicators of transition windows overlaid on the plot have a minimum duration corresponding to a minimum transition window size included in configuration information for the application.

In an embodiment, the plot includes types of content to be transmitted over time for each of the plurality of channels, wherein first segments on the plot corresponding to a first type of content are displayed as a first color and second segments on the plot corresponding to a second type of content are displayed as a second color.

In an embodiment, the first type of content comprises commercial content and the second type of content comprises non-commercial content.

In an embodiment, the display further is comprising: information for a first transition window including a start time, an end time, and a duration of the first transition window when the first transition window is selected via the GUI.

In an embodiment, the indicator of the one or more transition windows comprises, for each transition window, a bar overlaid on the plot of the schedule information having a thickness corresponding to the duration of the transition window.

In addition, the present disclosure relates to a method. The method is comprising: retrieving, by a processor, schedule information for a plurality of channels to be transmitted simultaneously by a broadcaster, the schedule information comprising start times and end times for types of content to be transmitted; identifying, by the processor, a start time and an end time for one or more durations within which all of the plurality of channels are scheduled to not transmit a first type of content; selecting, by the processor, a first duration during which a transmission system is to power down or power up; and transmitting, by a communications link with one or more components of the transmission system, a command to at least one component of the transmission system in dependence on the start time associated with the first duration.

In an embodiment, the command causes a prompt to be displayed including a time at which to power down or power up the at least one component.

In an embodiment, the command causes an action to be triggered at the at least one component at a time included in the command.

In an embodiment, the command is transmitted to a computer associated with a high-power amplifier (HPA).

BRIEF DESCRIPTION OF THE DRAWINGS

FIG. 6 shows an exemplary list of transition windows identified for individual channels and across channels in a multiplex according to one example.

FIG. 7 shows a method for coordinating a transition between a first transmission system and a second transmission system to minimize negative effects resulting from the transition according to various exemplary embodiments.

DETAILED DESCRIPTION

Figure 1:
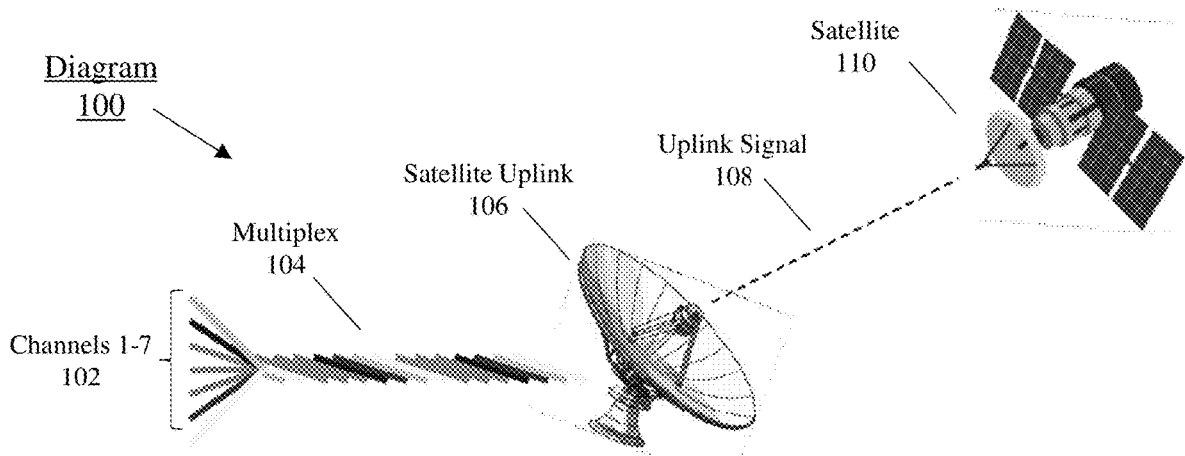
FIG. 1 shows an exemplary diagram including a multiplex of a grouping of channels according to one example.

The exemplary embodiments may be further understood with reference to the following description and the related appended drawings, wherein like elements are provided with the same reference numerals. The exemplary embodiments relate to systems and methods for coordinating a transition of a transmission stream from a first channel transmission system to a second channel transmission system. In particular, the exemplary embodiments relate to the identification of windows of time during transition from the first transmission system to the second transmission system will result in the least harm to a broadcaster.

The identification of these transition windows is based on scheduling information for each channel transmitted by the transmission systems and is dependent on various configuration parameters. Some of the exemplary embodiments relate to a display for presenting information to a user regarding channel schedules and transition windows in a cohesive format facilitating the ease with which the user can understand the options available for transitioning the transmission stream. Other exemplary embodiments relate to automated actions that can be triggered in dependence on the calculations. The manual procedures currently employed to address this issue are time consuming, e.g., on the order of hours, and therefore are available only to address transmission issues that can be identified well in advance. It is noted that the enhanced efficiency of the process by which these desirable transition time windows are identified allows broadcasters to react efficiently to situations that were formerly too imminent for any detailed analysis of the potential harm that would be imposed by a transition at a given time, much less to identify an optimum window for transmission.

In some embodiments, the channel transmission systems are included at respective transmission sites of a broadcaster in a redundant broadcast system, e.g., a satellite broadcast system. Each channel transmission system may include a chain of equipment, e.g., a satellite uplink, for transmitting an uplink signal to a satellite. The transition between the transmission systems can comprise the powering down of one satellite uplink at one transmission site and the powering up of the other satellite uplink at the other transmission site. For example, the two transmission sites may be selected so that they are substantially distant from one another geographically that it would be unlikely that they would both be affected simultaneously by the same event (e.g., a severe weather event or other natural disaster).

The exemplary embodiments are described with regard to scenarios in which a broadcast transmission is to be transitioned between a first satellite uplink located at a first site and a second satellite uplink located at a second site, wherein the transmission by the first satellite uplink cannot overlap with the transmission by the second satellite uplink, causing a brief duration in which there is a dropout in the broadcast. The exemplary embodiments are further described with regard to broadcast transmission operations in which multiple channels are combined by statistical multiplexing ("statmuxing") such that the brief dropout in service affects multiple channels and these multiple channels may present different programming/advertising schedules that need to be understood in order to assess the impact of a dropout at any given time.

In any multichannel broadcasting or streaming environment, there exists a plurality of channels, e.g., video/audio presentations with attendant metadata. The channels may be delivered via satellite or terrestrially over computer networks.

A broadcaster can transmit multiple channels simultaneously over a single communications link. Especially, when broadcasting over satellite, it may be advantageous to combine multiple channels together to form a single package, especially in scenarios where bandwidth is limited. The channels may be combined by statistical multiplexing, or "statmuxing" ("multiplex" as a verb). In statistical multiplexing, the multiple distinct channels generally share a single communications link, with each channel encoded as a variable bitrate stream.

Additionally, statmuxing provides a quality gain because the multiplexer intelligently looks at each channel in the multiplex and decides how much bandwidth to allot to each channel at any given time. Statmux units are typically given a minimum, average and maximum target bandwidth. For example, an average target bandwidth may be 8 Mbps per HD channel, with the variable bitrate ranging from 4 Mbps (minimum) and 16 Mbps (maximum) at any time. The statmux unit may see that one channel is playing black in that moment so it gets 4 Mbps, while another is simultaneously playing a complicated visual scene (e.g., confetti dropping in a New Years Eve event) and needs all 16 Mbps. Statmuxing maximizes the broadcast quality attainable for all channels given the limited amount of bandwidth available. The grouping of channels being statistically multiplexed can be referred to as "a multiplex" (as a noun).

FIG. 1 shows an exemplary diagram 100 including a multiplex 104 of a grouping of channels 102 according to one example. The grouping of channels 102 of this example includes seven channels (channels 1-7). The multiplex 104 is transmitted to a satellite uplink 106 and the satellite uplink 106 transmits an uplink signal 108 to a satellite 110 for broadcasting. Those skilled in the art understand that the satellite uplink 106 comprises a chain of equipment, e.g., high-power amplifiers (HPAs), antenna dishes (satellite dishes), etc., for transmitting the uplink signal 108.

It is noted that broadcasters using the term "multiplex" as a noun are generally referring to a multiplexed group of channels transmitted simultaneously over a single satellite transponder (or other such communication link), e.g., as shown in FIG. 1. However, the exemplary embodiments are not limited to this scenario and the term "multiplex" (as a noun) as used herein can refer to any grouping of channels.

Broadcasters may switch from the primary uplink to an alternate uplink many times per year, e.g., 12-20 times per year. The transition to the alternate uplink can occur for a variety of reasons, including maintenance, a local equipment issue, bad weather, or an interfering signal from, e.g., another broadcaster. In one example, the antenna dish or amplifier may need regular maintenance, e.g., cleaning the satellite dish periodically (e.g., every 6 months). In another example, a local issue may occur with equipment that may affect single channels or channel groups, e.g., failure of encoders, multiplexers, HPAs or the dish.

In still another example, inclement weather may interfere with the transmission of the signal between the primary uplink and the satellite. Alternatively, major weather events may cause power outages, equipment damage, etc. In still another example, another transmission overlapping the uplink signal can degrade the ability of the uplink signal to reach the satellite. In some cases, the switch from the primary uplink to the alternate uplink can occur frequently over a short span of time. The broadcast transmission can be switched back to the primary uplink when the issue necessitating the switch to the alternate uplink has been resolved.

Figure 2:
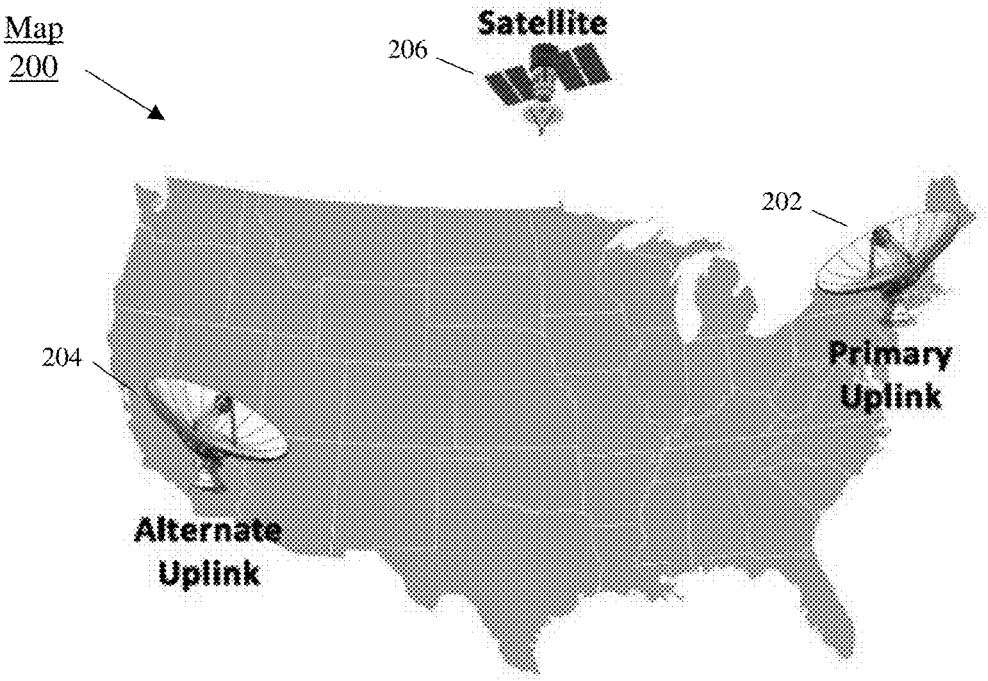
FIG. 2 shows an exemplary map including a primary uplink located on the east coast of the United States and an alternate uplink located on the west coast of the United States according to one example.

The alternate uplink is commonly separated by a significant distance from the primary uplink such that bad weather events (or other local conditions) impacting the primary uplink do not impact the alternate uplink. FIG. 2 shows an exemplary map 200 including a primary uplink 202 located on the East coast of the United States and an alternate uplink 204 located on the West coast of the United States. In this example, the primary uplink 202 is located in New York and the alternate uplink 204 is located in California such that conditions in New York affecting the uplink transmission (e.g., inclement weather) are unlikely to be felt in California. At any given time, either the primary uplink 202 or the alternate uplink 204 should be available for transmitting an uplink signal to a broadcast satellite 206.

When switching from the primary uplink to the alternate uplink, the primary uplink must first cease transmitting to the satellite ("beam down") and then, after a short pause, the alternate uplink will begin transmitting ("beam up"). Due to contractual regulations, transmissions from the two sites must not overlap. This necessarily leads to a brief dropout in the broadcast (e.g., from 3-8 seconds) that affects all channels in the multiplex. The same process is performed for switching the transmission from the alternate uplink back to the primary uplink when the primary uplink is again ready for operation.

If the dropout were to occur when commercials are airing on one or more of the channels in the multiplex, the broadcaster may lose the revenue for those commercials. This may be substantial as, for example, the average cost of a single 30 second commercial during the Superbowl may be several million dollars. This problem is compounded by the possibility that multiple channels (e.g., all of the channels of the multiplex) will be affected during the switch.

Each channel in the multiplex is generally airing different material on a different schedule. These schedules generally comprise many types of component parts including, for example, long-form content (pre-recorded or live shows), advertisements/commercials, promos for other shows on that or other affiliated channels, and/or bumpers (small pieces of content that tell the viewer what they're watching). Long form content (e.g. a one-hour episode of a program) is often broken up into multiple segments so that commercials may be played in multiple blocks each hour (in the United States, advertisements typically take up from 12 to 20 minutes each hour depending on the channel/network). For example, a nominally hour-long show might be broken into four 10-minute segments, each of which is followed by a 5-minute commercial break, where the actual show takes up 40 minutes, and the commercials take up 20 minutes.

Figure 3A:
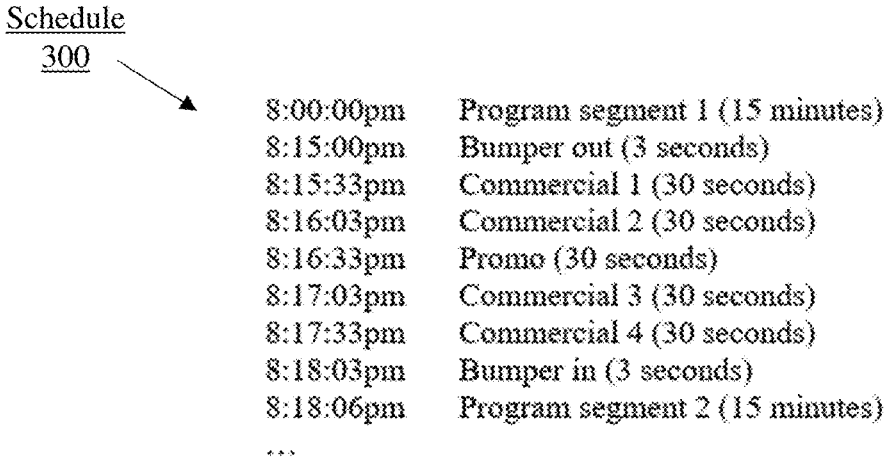
FIG. 3a shows an exemplary schedule for a channel according to one example.

FIG. 3a shows an exemplary schedule 300 for a channel according to one example. In this example, a program on the channel begins at 8:00:00 pm. A first program segment (15 minutes) is followed by a first bumper (3 seconds), two commercials (30 seconds each), a promo (30 seconds), two more commercials (30 seconds each), and a second bumper (3 seconds). A second program segment (15 minutes) then begins and can be followed with bumpers, commercials, etc. This type of schedule may be ongoing at all times on any given channel.

Figure 3B:
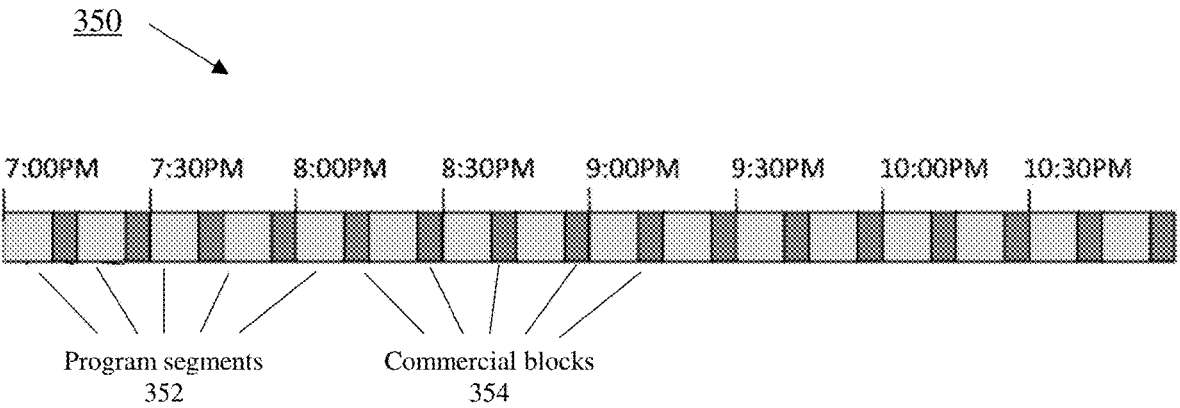
FIG. 3b shows an exemplary schedule for a channel according to another example.

FIG. 3b shows an exemplary schedule 350 for a channel according to another example. In this example, a simplified linear view is shown in which a long-form program segment 352 starting at 7:00:00 pm is followed by a commercial block 354, which is followed by another long-form program segment 352, etc. It should be understood that the commercial block 354 of this example includes everything that is not long-form programming, e.g., not only the commercial content but promos, bumpers, etc. as well.

It is noted that the exemplary schedules 300, 350 described above focus on primary video events. There are many other kinds of events in a broadcast schedule that have been omitted for clarity, including but not limited to graphics, video effects (squeezes, fades, etc.), audio processing commands, external device commands, signaling metadata (e.g. SCTE-35, V-CHIP, CGMS-A, etc.), live feed and other video routing/switching, keyer commands, up-/down-convert commands, aspect ratio commands, and textual comments or requests for channel operations staff. For example, the broadcast may include signals identifying ad slots and these signals may be used by local (e.g., regional) broadcasters to replace advertisements included in national broadcasts. If a dropout prevents these signals from airing, the regional broadcasters may fail to make the proper insertion of an ad and their revenues may be further impacted.

In this sense, commercials may be the most important content in a broadcast and a broadcaster will generally want to ensure that interruptions to these ads are minimized. If a commercial fails to air completely or even if it includes a short glitch or dropout, the broadcaster/channel may not get paid for airing that commercial. In an alternative scenario, it may be more desirable to minimize interruptions to long-form program content. For example, this may occur when a popular show is airing a highly anticipated episode such that any interruptions would result in a high number of dissatisfied viewers. In another alternative scenario, a broadcaster can choose any other component of the broadcast to protect during a transition event, including but not limited to any of the events/components described above.

Accordingly, when switching between satellite uplinks, it is desirable to choose a time to execute the switch such that interruptions are timed to minimize any harm to the broadcaster (e.g., by reviewing the schedules of the various channels to select a timing for the switch that minimizes interruptions to these important types of programming). Those skilled in the art will recognize that this process is complicated and involves a detailed ranking of not only the general types of content (e.g., ads vs. long form program content) but that there may be a ranking between different ad slots at different times of day on different channels (or even at different points within a single program on a single channel) or between different airing times for the same long form program content.

According to various exemplary embodiments, operations are described for coordinating the transition of a transmission stream. The exemplary embodiments described herein are directed to minimizing the harm incurred by a broadcaster due to a dropout in service associated with the transition. In some embodiments, windows of time may be identified, for example, during which none of the channels on a selected satellite transponder is scheduled to be in a commercial break so that the transition may be implemented to minimize risk to commercial content. The exemplary embodiments can replace hours of tedious time- and personnel-intensive work during high-stress events and can also enable the system to address issues that are not feasible with the current manual methods (e.g., because the reason motivating the transition arises with too little lead time to permit manual analysis). In these cases, now, the current system results in a transition at a substantially random time without regard to the potential harm associated with the timing.

In some aspects of these exemplary embodiments, a software application is described for coordinating a transition from a first broadcast system to a second broadcast system. The application can run locally on a desktop computer, at a server, or at a cloud service. The exemplary software application can interface with various other subsystems of a broadcast network or external to the broadcast network, including but not limited to playout systems, components of a transmission system (e.g., satellite uplink), and other systems. In some embodiments, the software application can provide a display for providing a user with information relevant to making a manual decision regarding when to initiate a transition from a first broadcast system to a second broadcast system.

According to various embodiments, windows are identified during which a transition between satellite uplinks will minimize the harm incurred by the broadcaster due to the corresponding dropout in satellite service. In other words, windows are identified during which an operator of a broadcast network can safely transition between a first uplink (e.g., a primary uplink) and a second uplink (e.g., an alternate uplink) for any one of the multiple reasons that require such switches relatively frequently, e.g., multiple times per year.

The exemplary transition coordinator application may interface with a variety of media playout systems, e.g., Trident, Evertz or Grass Valley, to retrieve channel schedules. The application can contain a small database of configuration information and multiplex layouts, e.g., identifying which channels are grouped into a particular multiplex as will be explained in further detail below.

Figure 4:
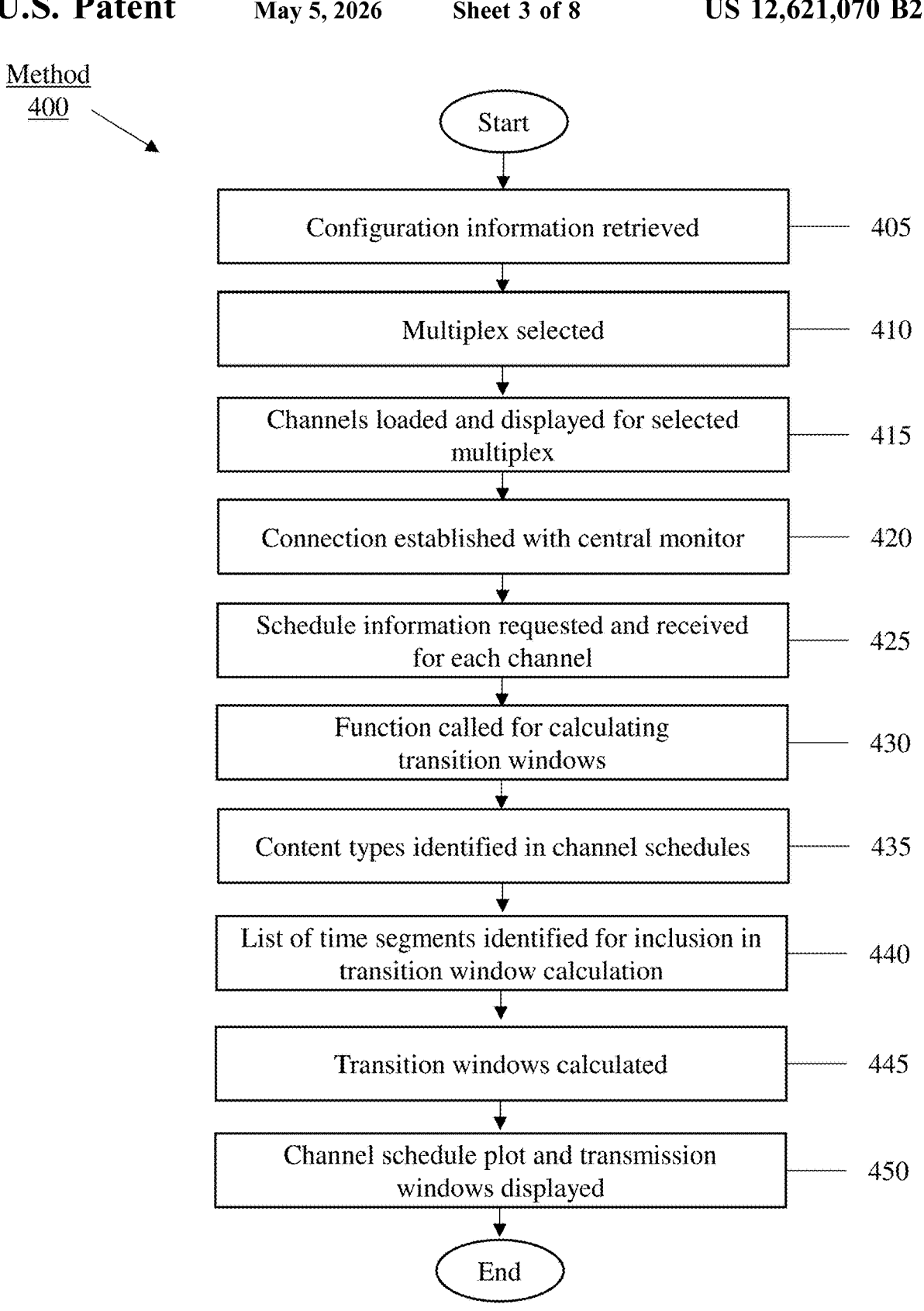
FIG. 4 shows a method for determining a transition window for switching from a first broadcast system to a second broadcast system according to various exemplary embodiments.

FIG. 4 shows a method 400 for identifying an optimum transition window for switching from a first broadcast system to a second broadcast system according to various exemplary embodiments. The first and second broadcast systems may comprise a first satellite uplink at a first transmission site and a second satellite uplink at a second transmission site. The method 400 is described with regard to execution by a device in communication with various components of a broadcast system, e.g., the user device 805 described in further detail below with regard to FIG. 8.

The device comprises a processor and a display and can run a software application comprising executable instructions for performing various operations and providing a graphical user interface (GUI) for display on the device. The device further comprises a memory for storing the executable instructions and various information for, e.g., calculating transition windows, to be described in further detail below. In other embodiments, the calculation of the transition window can be performed at a server/cloud service. The method 400 is further described with regard to the display 500 shown in FIGS. 5a-d.

In 405, the device retrieves configuration information including, for example, a list of all multiplexes transmitted by the broadcaster and the channels that make up each multiplex. Channel information may include a channel name, a channel type, a channel time zone (e.g. east or west coast), and playout connection information, e.g., so that the application can interface with a playout system for a given channel to retrieve schedule information for the channel. Schedules are often done in a single time zone such that scheduled times need to be offset for other time zones.

The configuration information can further include a schedule lookahead window, e.g., how far into the future to search for transition windows. In one example, the default lookahead window can comprise 18 hours. The value for the lookahead window can be adjusted by a user via the GUI of the device in consideration of various factors including, e.g., the urgency of the transition, minimizing processing time, etc. Additionally, broadcast schedules are subject to constant change (e.g. programs or commercials may be swapped out, promos added, etc.) and become less trustworthy further out in time.

Accordingly, it is often desirable to look for transition windows closer in time. This again makes the current embodiments suitable for optimizing this process in a manner and to an extent not possible with the current methods. That is, because of the time and labor-intensive nature of these processes as well as the ever-changing schedules of many broadcast channels, the information used by the current methods is often obsolete by the time an "optimized" window has been identified.

The configuration information further includes a minimum transition window size. To actually transition, a multiplex requires a minimum amount of time that can vary depending on the configuration of the transmission system and the capabilities of both equipment and staff. For example, turning off a satellite uplink can require the coordinated execution of a number of successive steps for shutting down the various components of the satellite uplink. Further, turning on the second satellite uplink can require successive steps conversely corresponding to those for shutting down the first satellite uplink.

Some aspects of these steps are performed manually, and the operations staff needs a minimum amount of time to actually transition the multiplex. Thus, a transition window of, e.g., 3 seconds, would not be desirable. Some of these steps for shutting down and/or turning on a transmission system can be automated while other ones of these steps are preferably performed manually. The moment when the first uplink signal drops out is dependent on the amount of time taken by each successive step, which can vary based on unforeseeable factors each time the uplink is transitioned.

Accordingly, the transition window is preferably sufficiently large to account for the temporal uncertainties inherent in transitioning an uplink stream. In one example, the default transition window may be 90 seconds. The value for the transition window can be adjusted by a user via the GUI of the device in consideration of various factors including, e.g., the availability of transition windows with a first minimum size (e.g., can be adjusted down to a second minimum size if no transition windows are available having the first minimum size).

It is noted that, in some scenarios, the transition between broadcast systems may be foreseeable such that the broadcaster has a large window of time during which the transition may be executed. For example, when routine maintenance (e.g., cleaning) needs to be performed this may not be urgent and permits more time for scheduling the transition. In other scenarios, the transition between broadcast systems may be relatively urgent. For example, a weather forecast may indicate the likelihood of inclement weather in the near future (e.g., in the next few hours). The configuration parameters can be set and/or adjusted in dependence on these types of considerations.

The configuration information may further include various other default aspects/settings that may be adjusted by a user according to various considerations, to be described in further detail below. In one illustrative example, the type of content to be prioritized when calculating transition windows (the type of content to be avoided during the transition such that this content airs correctly) may be commercials or commercial blocks, such that the transition window is to be calculated for durations when only non-commercial content is scheduled to be played, as described below with regard to the exemplary display 500 of FIG. 5*d*. The priority between the content types can be established in advance in the configuration settings. In other embodiments, the content priority could be adjusted by a user. That is, a user may rank all of the items in a schedule for each of the channels of a given multiplex so that a total value for any given transition time may be calculated and compared to other times. Thus, the system may select one or more time slots having a minimum total value for consideration (along with other factors) in making the identification of the optimum transition time period. In still other embodiments, other types or additional types of content can be included in the calculation and/or be prioritized/deprioritized.

Figure 5A:
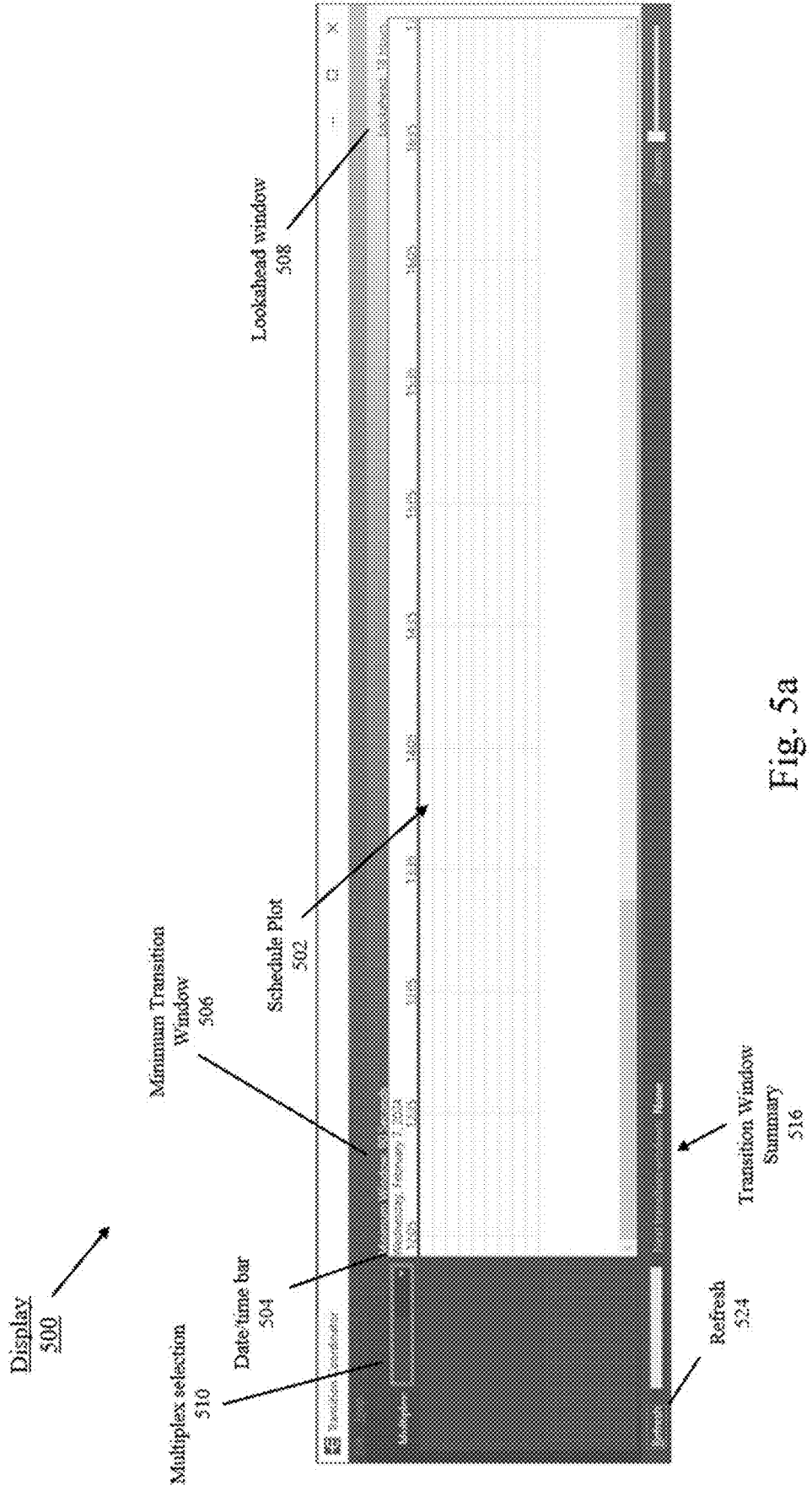
FIG. 5a shows an exemplary display for coordinating a transition between a first transmission system and a second transmission system to minimize negative effects resulting from the transition according to various exemplary embodiments.

FIG. 5*a* shows an exemplary display 500 for coordinating a transition between a first transmission system and a second transmission system to minimize negative effects resulting from the transition according to various exemplary embodiments. The display 500 of this example comprises a graphical user interface (GUI) provided by a software application of the device.

The display 500 includes a schedule plot 502 for presenting schedule information for various types of content (e.g., commercials and/or long form content) to be aired on a channel. In the example of FIG. 5*a*, the schedule plot 502 is not yet populated with channel schedule information. The schedule plot 502 may eventually be populated with schedule information for each channel of the multiple channels included in a selected multiplex as will be described below with regard to FIG. 5*d*.

The schedule plot 502 includes a date/time bar 504 across its top indicating the time at which a particular segment of a content type starts and stops for a channel. The date/time bar 504 can extend from a start time (corresponding to the current time) to an end time calculated based on the configured lookahead window. The schedule plot 502 can be magnified so that a user can view a selected portion of the lookahead window in greater detail.

Some configuration parameters are shown in the display 500, in particular, a minimum transition window 506 and a lookahead window 508. In this example, the minimum transition window 506 is set as 90 seconds and the lookahead window 508 is set as 18 hours. Those skilled in the art will understand that additional configuration parameters may be shown that influence the calculation of transition windows and may be adjustable by the user as will be explained in greater detail below. The display 500 further includes a refresh function 524 for re-running the transition window calculation, e.g., with adjusted parameters and/or at a later time to retrieve updated schedule information, to be explained in greater detail below.

Figure 5B:
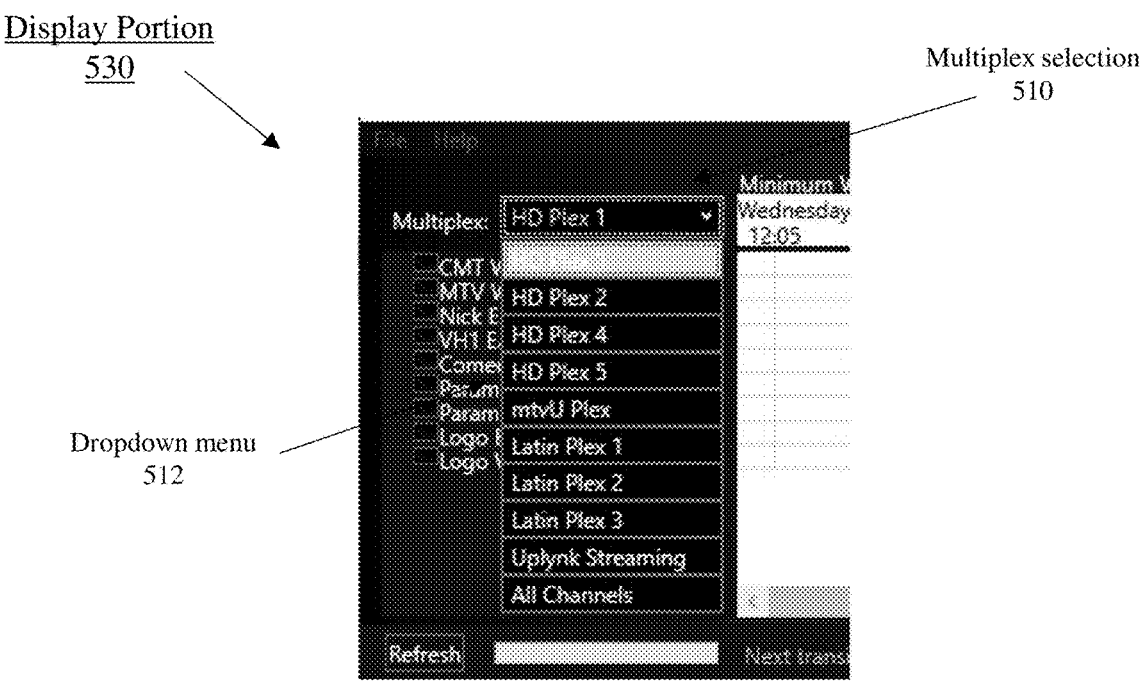
FIG. 5b shows a portion of the display of FIG. 5a including a dropdown menu for multiplex selection.

The display 500 includes a field for multiplex selection 510 that comprises a dropdown menu 512, as shown in FIG. 5*b*. The display 500 further includes a transition window summary 516 (in the example of FIG. 5*a*, no transition windows have yet been calculated).

FIG. 5b shows a portion 530 of the display 500 of FIG. 5a including a dropdown menu 512 for multiplex selection 510. The dropdown menu 512 includes each multiplex included in the configuration information. The dropdown menu 512 further includes an option to select "all channels" across all multiplexes.

In 410, a user selects from the list of multiplexes a given multiplex to analyze. In this example, the user selects the multiplex "HD Plex 5."

In 415, the application loads and displays a list of channels associated with the selected multiplex.

Figure 5C:
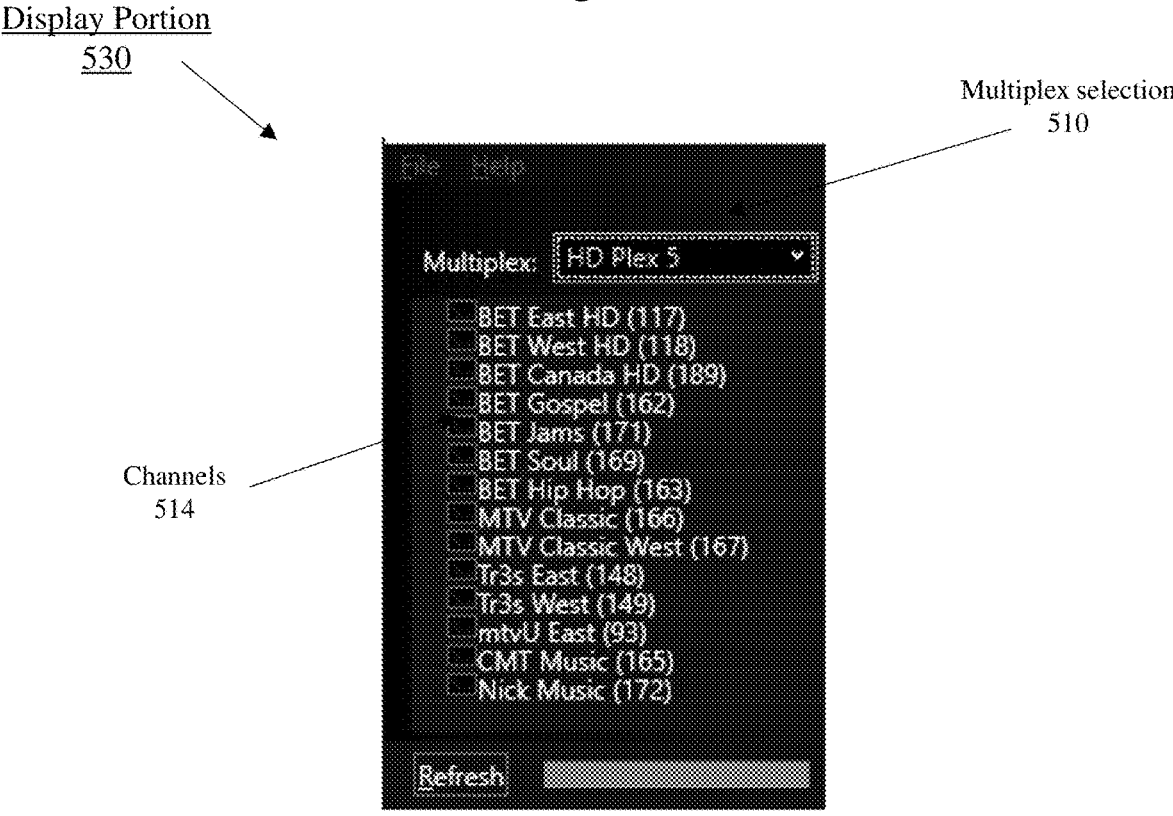
FIG. 5c shows the portion of the display of FIG. 5b including channels 514 included in the selected multiplex (HD Plex 5).
Figure 5D:
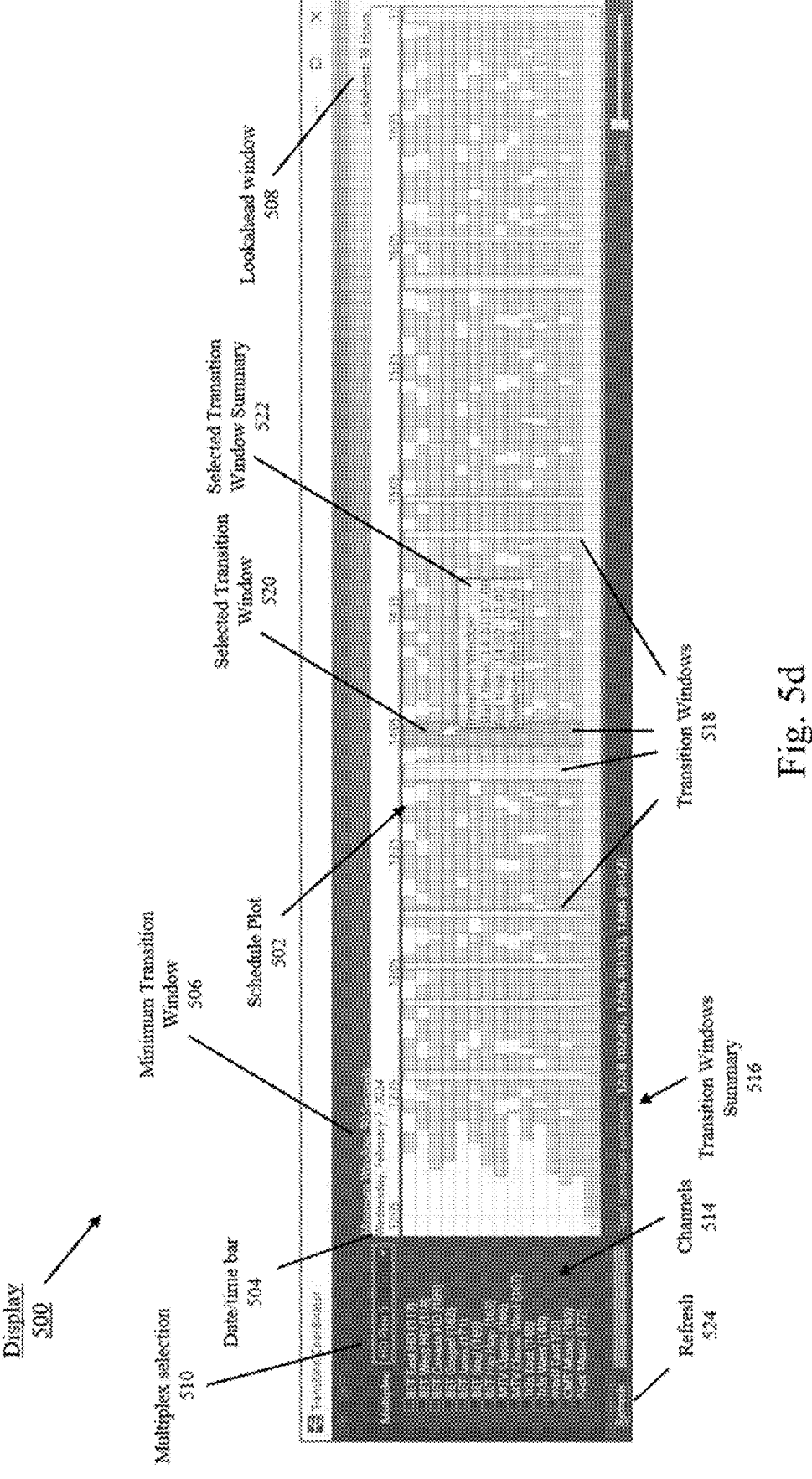
FIG. 5d shows the exemplary display of FIG. 5a with a graphical user interface (GUI) populated with schedule information and transition window information.

FIG. 5c shows the portion 530 of the display 500 of FIG. 5b including channels 514 included in the selected multiplex (HD Plex 5). The channels 514 are displayed below the field for multiplex selection 510 to the left of the schedule plot 502, such that the schedule plot 502 is populated with schedule information for a channel directly to the right of the display of channels 514, as shown in FIG. 5d. In this example, the display 500 includes 14 channels.

In 420, the application connects to one or more systems and/or services containing schedule information for the channels 514 included in the selected multiplex. In some embodiments, the system/service comprises a central monitoring service maintained by the broadcaster. The central monitor (e.g., "Linear Console") can access one or more playout systems and retrieve updated schedules for each channel. The central monitor may be hosted in the cloud, on a server, or locally at a transmission site. The central monitor may store the schedule information for all of the underlying playout technologies. In other embodiments, the application can connect to one or multiple individual playout systems for each of the channels in the selected multiplex based on the configuration information. The application can interface with a variety of media playout systems, e.g., Trident, Evertz or Grass Valley, to retrieve channel schedules.

In 425, for each channel included in the selected multiplex, the device requests the current schedule from the central monitor (or from one or more playout systems/servers). To minimize processing time, the device requests schedule information only for a duration corresponding to the lookahead window 508, e.g., the next 18 hours.

In 430, the device terminates its connection from the central monitoring service and calls a function to calculate transition windows for the selected multiplex.

In 435, the device identifies segments of content in each channel schedule based on type (or based on an assigned value parameter). In one example, the function identifies commercial and non-commercial blocks of time. The configuration information for the transition window calculation can indicate which type(s) of content are to be avoided, e.g., commercials or commercial blocks (including additional content types), such that blocks of non-commercial content are identified as such for consideration in the transition window calculation. In other embodiments, the device identifies additional types of content, e.g., long-form programming, bumpers, promos, etc. However, in the present example, these types of content are collectively identified as non-commercial content.

In 440, the device identifies a list of time segments to be considered in the transition window calculation. In the present example, the list comprises the non-commercial content. The function returns a list of every noncommercial block for each channel.

In 445, the device calculates a list of transition windows. The list of transition windows can comprise zero, one or multiple transition windows. In some embodiments, the function/algorithm finds all transition windows regardless of size so that, if the user changes the minimum transition window size, the previously identified transition windows satisfying the new size condition can be identified and presented (e.g., without recalculating the transition window list every time the user changes the minimum transition window size filter). By default, transition windows can be calculated across every channel in the multiplex. These transition windows correspond to start and end times when, for example, there are no commercials playing on any of the channels in the multiplex (or where a number of channels playing commercials is a minimum). According to one example described in further detail below, an algorithm is described for calculating the transmission windows.

FIG. 6 shows an exemplary list 600 of transition windows identified for individual channels and across channels in a multiplex according to one example. In this example, three channels are included in the multiplex. Non-commercial segments (windows) are listed for a first channel (windows 602 for Channel 1), a second channel (windows 604 for Channel 2) and a third channel (windows 606 for Channel 3). Transition windows are listed where there are only non-commercial segments scheduled to air across all three channels (windows 608 "Composite").

These lists can be processed to calculate a plot for display on the graphical user interface (GUI) of the software application presented on the display. In particular, the windows for each of the channels can be plotted on the schedule plot 502 described in FIG. 5a.

In 450, the application displays the schedule plot 502 of the schedules and all of the transition windows on the GUI. In this example, the content windows for each of the channels are processed for display as blocks of a first color/shade having a given thickness (in the vertical direction) and a length corresponding (in the horizontal direction along the date/time bar 504) to their respective durations. The transition windows can be processed for display as vertical bars across the channels, the width of the bar (in the left/right direction along the date/time bar 504) being dependent on the duration of the transition window. As described above, even if all transition windows are calculated in 445 (regardless of duration), only the transition windows having a duration greater than or equal to the minimum transition window size are displayed.

FIG. 5d shows the exemplary display 500 of FIG. 5a with the GUI populated with schedule information and transition window information. The schedule plot 502 includes blocks of a first color corresponding to non-commercial programming for each channel, the channels being in the same order in which the channels 514 are displayed to the left of the schedule plot 502. In some embodiments, the blocks for each channel are aligned with the respective channels 514 in the list. The time blocks from the list are mapped to the date/time bar 504. The time segments along the date/time bar 504 corresponding to commercial content (or any other type of content to be protected, e.g., graphics, signaling, etc.) can be displayed as a second color so that a user can easily identify the multiple different segment types. In general, only the non-protected content (in this case, non-commercial content) needs to be identified and considered in the transition window calculation while protected content comprises the time durations that are not considered in the transition window calculation, which could be any kind of scheduled content or signaling.

Potential transition windows 518 are displayed on the schedule plot 502 as bars overlaying the schedules of each channel 514. The transition windows 518 can be displayed as a third color different from the first and second colors so that a user can easily identify the transition windows 518. The shorter transition windows 518 are shown as thinner vertical bars and the longer transition windows 518 are shown as thicker vertical bars due to the longer duration along the date/time bar 504. The aspect of the GUI comprising the summary 516 can identify a start time and a duration for multiple transition windows. In some embodiments, every transition window within the lookahead window 508 is included in the summary 516. In the example of FIG. 5d, upcoming transition windows (nearest in time) are included in the summary 516, with a maximum of three. In other embodiments, the largest transition windows (in duration) can be included in the summary 516, or a different number of transition windows can be included.

Any one of the transition windows 518 can be selected so that additional information can be displayed for the selected transition window. Users can click or hover over individual transition windows to display detailed information about the window. In the example of FIG. 5d, a transition window 520 is selected. A selected transition window summary 522 can pop up to show the exact start time, end time, and duration of the transition window 520.

Accordingly, based on the display 500 described in FIGS. 5a-d, a user can quickly and effectively identify transition windows according to the configured parameters for transition window calculation.

In some cases, a user may decide to re-execute the application with different configuration settings and/or updated schedule information. In one example, the user can select the refresh function 524 so that the device retrieves updated schedule information and re-runs steps 420-450 with the same configuration settings, e.g., to determine whether the available upcoming transition windows have changed due to schedule changes or changes to the time required for the transition, etc.

In other examples, the user may exclude one or more channels in the multiplex from the transition window calculation. This may occur when, e.g., the previous transition window calculation did not return any suitable results or for any other reason. In one example, if a particular one or more of the channels is deemed less important than other ones of the channels, the user can select to exclude these channels. The channel may be offline or less valuable to the broadcaster (e.g., if channel A makes $1B in annual revenue, and channel B has no commercials or only makes $1M in annual revenue, channel B can be deselected to prioritize channel A, especially if no windows are found initially). In another example, if the user notices (e.g., by inspecting the schedule plot 502) that the schedule of one channel is greatly affecting the available transition windows, the user can select to exclude this channel. This functionality may be implemented via the aspect of the GUI comprising the list of channels 514. In one example, certain channels can be selected/deselected (e.g., by checkboxes to the left of the channel name) and the user can select to refresh the refresh function 524 the transition window calculation.

In another example, the user may adjust the size of the minimum transition window 506. Similar to above, the user can select to adjust the size of the minimum transition window 506 downward (e.g., shorter transition window durations are considered), e.g., if the previous transition window calculation did not return any suitable results. The shorter the transition window setting, the more likely it is to find suitable windows. As described above, the application can calculate every transition window regardless of duration. Thus, in this case, the application can adjust the display of the transition windows to include transition windows meeting the new minimum size without recalculating the transition windows.

In still another example, the user may adjust the lookahead window, e.g., to look further into the future for transition windows. This would necessitate the re-retrieval of schedule information and the re-execution of steps 420-450.

In the example embodiments described above with regard to FIGS. 4, 5a-d and 6, the calculation generally comprises the following configuration settings: commercial content is prioritized, and non-commercial content is available for calculating the transition window; a lookahead window is defined; a minimum transition window is defined; and the schedules of all channels in a multiplex are included in the transition window calculation. In one example, the algorithm for calculating the transition window comprises the following aspects.

The primary algorithm is based on the following:

Given the schedules for each channel in a numbered list 1 . . . N where N is the number of channels;

Given that a valid time is a real time in the future;

Given that a transition window is expressed by a valid start time and a valid end time, where the end time is later than the start time;

Given that two non-overlapping transition windows have no intersection;

Given that the intersection Z between two overlapping transition windows X and Y is a transition window that has:

A start time that is the later of the start time of X or the start time of Y and An end time that is the earlier of the end time of X or the end time of Y;

Given that each schedule is expressed as a list of transition windows;

Given an initially empty list of transition windows WL into which to place results;

Given the subalgorithm CalculateWindows which takes an input window W and an input schedule index S, which does the following:

Loop over the contents of schedule number S, checking for all intersections of transition windows in schedule number S with input window W, If an intersection K is found:

If S is less than N, recursively use subalgorithm CalculateWindows with parameter K and S+1;

If S is equal to N, and the duration of K is greater than the minimum transition window duration D, add the window to WL.

The primary algorithm is configured to:

1) Calculate the widest possible transition window WW, using the earliest transition window start time from all playlists, and the latest transition window end time from all playlists (If no valid transition window can be constructed in this manner, abort with no results);

2) Use the subalgorithm CalculateWindows with the parameters WW and 1; and

3) Return the resulting transition window list WL to the caller.

In further aspects of these exemplary embodiments, different types of configuration parameters can affect the calculation of the transition windows.

In one aspect, long-form content can be prioritized in the calculation at the expense of commercials or specific long-form content may be prioritized over advertisements while other long-form content is not. Similarly, certain ad slots may be prioritized over long-form content while others are not or each item on each schedule may be assigned a value (e.g., a value parameter) that allows for a ranking of every schedule item on every channel in assessing the impact associated with the selection of each of the various potential transition windows.

In another aspect, additional types of content can be included in the calculation (and each of these items may also be assigned a value parameter). For example, bumpers, promos, etc. can be included. It may be most desirable to have a dropout in service when a bumper/promo is playing, or these may be prioritized over long form content, if desired. In another example, various signaling in the broadcast can be prioritized.

In another aspect, price can be factored in. For example, some channels are worth more in advertising revenue than other channels. If, for example, no suitable transition window is found that does not avoid commercial interruptions on every channel, the values of the channels can be provided and or included in a calculation of transition windows that minimize the financial harm incurred.

In still further aspects of these exemplary embodiments, the device can include additional functionalities for coordinating the actual transition between the transmission sites. In some embodiments, the configuration information can include a known progression of steps for powering down and/or powering up a transmission site, e.g., the satellite uplink. As described above, the transmission transition can comprise a number of steps (typically performed manually) that occur in succession, e.g., the successive shutting down of particular components, e.g., encoders, multiplexers, HPAs or the dish. These steps may generally total some duration less than the minimum transition window size such that, if the powering down/up initiates at the start of the transition window, the whole process is estimated to be completed before the end of the transition window. The device can calculate estimated timing cues for each operation.

In still further aspects of these exemplary embodiments, the device executing the transition window calculation software can send commands to one or more components of the transmission system, e.g., the satellite uplink, to automate aspects of the powering down and/or powering up of the satellite uplink.

According to some current practices, transitioning the satellite uplink from a primary uplink to an alternate uplink can comprise the following steps. First, a conference bridge is opened between all interested parties, including but not limited to the broadcaster, the satellite controller, and operations staff at both the primary and alternate transmission sites. The satellite controller owns, operates, and leases the transponders on the various satellites used to receive the uplink signal and transmit the channels. Next, baseline readings are taken/received. The operations staff(s) can take readings of carrier and margins and the satellite controller can provide current downlink Effective/Equivalent Isotropic Radiated Power (EIRP), which is a measurement of radiated output power of an antenna and corresponds to the maximum power emitted by the antenna in the direction with highest antenna gain.

Via the conference bridge, the operations staff at the primary uplink and the operations staff at the alternate uplink can coordinate (e.g., via a countdown) the moment at which the HPA is disabled at the primary uplink and the HPA is enabled at the alternate uplink. The respective HPAs can be enabled/disabled in various ways, e.g., by a computer in communication with the HPA or on the HPA itself. The enabling/disabling of the HPAs can be done via a mouse click, via a button on the HPA, or in other ways. Next, integrated receiver/decoders (IRDs) for the satellite return are checked for lock and proper signal level. The satellite controller provides a new downlink EIRP so that power can be adjusted, if necessary. The operations staff can see all the returns and, once all parties are satisfied, the conference bridge is closed.

In view of the above current practices, the transition coordination application can assist in streamlining the actual transition process. In some embodiments, the device executing the application can send a prompt to one or more components for triggering an operation at the component at a particular time. For example, if estimated timing cues for components are calculated, the device can send a command to particular components including a prompt at a display associated with the component comprising a start time for an operation to be performed at the component, e.g., initiating a powering down of the component. In one example, this prompt can be sent to a computer controlling a HPA or to the HPA itself to facilitate the enabling/disabling of the HPA.

In some embodiments, the start time could be a suggested start time included in a prompt, subject to confirmation by a user. In other embodiments, the prompt can be associated with an automatic trigger at a particular time, subject to manual override prior to the particular time. In still other embodiments, a trigger command can be sent to a component at a particular time to trigger an operation at the component at the time the command is received. The device can coordinate multiple aspects of the powering down/ powering up operations and send multiple trigger commands to multiple components.

In some embodiments, commands can be sent to both of the transmission sites such that transition operations are coordinated in consideration of the respective operations of both sites. Those skilled in the art understand that powering down/up a transmission system can include a variety of tasks related to various pieces of equipment. Some of these tasks can be automated, while others are preferably performed manually.

FIG. 7 shows a method 700 for coordinating a transition between a first transmission system and a second transmission system to minimize negative effects resulting from the transition according to various exemplary embodiments. In this example, the method 700 can begin after step 445 of FIG. 4 described above.

In 705, the device selects a transition window to implement. The selection could be done manually at the device or automatically, e.g., the largest transition window calculated is selected.

In 710, the device calculates a schedule for powering down/powering up multiple components of the first and/or second transmission system. The schedule can be calculated from the start of the selected transition window.

In 715, the device transmits one or more commands to one or more components of the transmission system(s). The command can comprise a prompt or a trigger for executing operations at the component.

In still further aspects of these exemplary embodiments, the application described for calculating transition windows can be modified for other purposes in anticipation of an interruption in regular service. In one example, the broadcaster may intend to transmit an announcement/news update that will interrupt regular service and it may be desirable to ensure this update does not affect any prioritized programming, e.g., commercials.

For example, the update can comprise a graphic over scheduled programming on all channels to alert viewers that some channels might be going away due to an affiliate negotiation dispute, which can happen several times per year. Windows can be identified for airing the update that ensures commercials are not affected and revenue is not lost. In another example, cross-channel simultaneous announcements/news updates can be identified that do not interfere with scheduled commercials.

In still further aspects of these exemplary embodiments, the application can synchronize simulcasts across multiple channels to ensure all segments align (the windows of opportunity would match the scheduled segments). For example, award shows and hit shows may be simulcast across many (potentially dozens of) channels.

The exemplary embodiments are described above with regard to multiplexes of channels broadcast by satellite. However, those skilled in the art would understand that these exemplary embodiments are broadly applicable to any multi-channel environment (broadcast, streaming, etc.).

Figure 8:
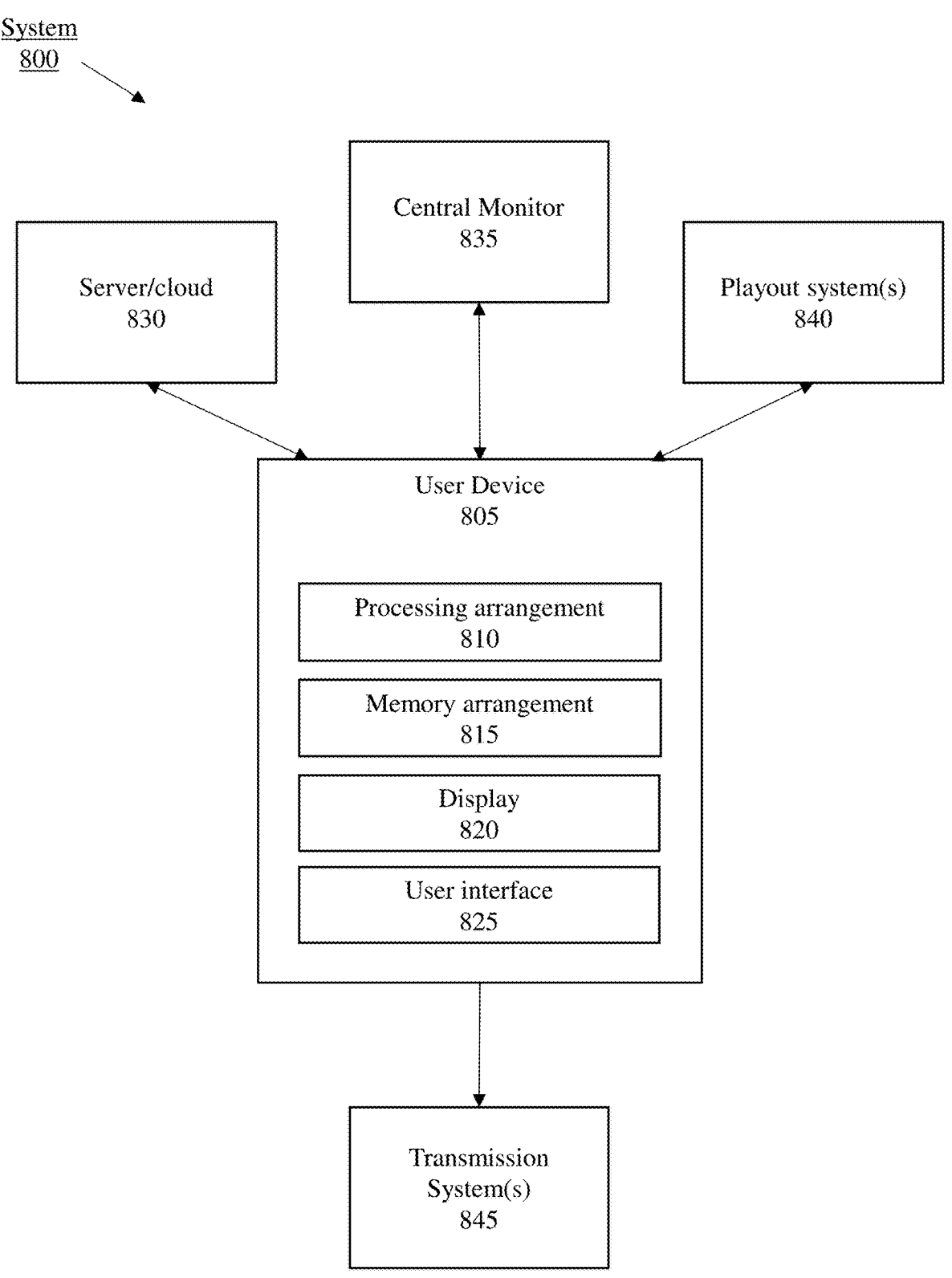
FIG. 8 shows a system for transition coordination according to various exemplary embodiments.

FIG. 8 shows a system 800 for transition coordination according to various exemplary embodiments. The system 800 includes a user device 805 comprising a processing arrangement 810, a memory arrangement 815, a display 820 and a user interface 825. The memory arrangement 815 can store executable instructions (e.g., the transition coordination application) and configuration information for a transition coordination application. The display 820 can present a GUI of the transition coordination application to a user. The user interface 825 can allow the user to interact with the GUI to execute operations related to the transition window calculation.

The user device 805 may be in communication with a server 830 (or cloud service) that can host the transition coordination application and/or provide the transition coordination application for the user device 805 to run locally. The user device 805 may also be in communication with a central monitor 835 of a broadcast system and/or one or more playout systems 840 for retrieving schedule information for a plurality of channels. The user device 805 may also be in communication with one or more components of a transmission system 845, e.g., a satellite uplink, so that commands can be sent to the one or more components to transition the coordination of the transmission stream.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as ios, Android, etc. In a further example, the exemplary embodiments of the above-described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A system, comprising:
a memory storing an application comprising executable instructions for calculating a transition window and providing a graphical user interface (GUI), the memory further storing configuration information for the application;
a display configured to display the GUI and receive user input;
a processor configured to perform operations comprising:
retrieving schedule information for a plurality of channels to be transmitted simultaneously by a broadcaster, the schedule information comprising start times and end times for types of content to be transmitted;
identifying, from the schedule information, first segments of time in which a first type of content is to be transmitted and second segments of time in which the first type of content is not to be transmitted;
displaying, on the display, a plot of the schedule information for the plurality of channels, the plot including the types of content to be transmitted over time for each of the plurality of channels, wherein the first segments corresponding to the first type of content are displayed as a first color and the second segments are displayed as a second color;
identifying, from the second segments of time for each channel, one or more transition windows comprising durations within which all of the plurality of channels are scheduled to not transmit the first type of content; and
overlaying on the plot an indicator of the one or more transition windows.

2. The system of claim 1, wherein the configuration information includes a lookahead window defining a duration of time within which the one or more transition windows are identified, wherein the schedule information is retrieved for the plurality of channels for the duration corresponding to the lookahead window.

3. The system of claim 1, wherein the configuration information includes a minimum transition window size comprising a minimum duration and wherein the indicator of the one or more transition windows overlaid on the plot comprise only those transition windows comprising the minimum duration.

4. The system of claim 1, wherein the processor is configured to perform further operations comprising:
receiving, via the GUI, a selection of a multiplex from a list of multiplexes, the multiplex being associated with the plurality of channels; and
displaying, via the GUI, a list of the channels.

5. The system of claim 4, wherein the first type of content comprises commercial content such that the one or more transition windows are calculated for durations within which all of the plurality of channels are scheduled to not transmit the commercial content.

6. The system of claim 1, wherein the processor is configured to perform further operations comprising:
receiving, via the GUI, a selection of a first indicator of a first transition window; and displaying, via the GUI, information for the first transition window including a start time, an end time, and a duration of the first transition window.

7. The system of claim 1, wherein the processor is configured to perform further operations comprising:

receiving, via the GUI, a selection of a first channel of the plurality of channels to exclude from consideration when identifying the transition windows; and recalculating the transition windows without considering the first channel.

8. The system of claim 1, wherein the indicator of the one or more transition windows comprises, for each transition window, a bar overlaid on the plot of the schedule information having a thickness corresponding to the duration of the transition window.

9. A display comprising a graphical user interface (GUI) of an application for calculating a transition window, the display comprising:

a multiplex selection field comprising a drop-down menu for selecting one of multiple multiplexes comprising a plurality of channels to be transmitted simultaneously by a broadcaster;

a list of channels included in a selected multiplex;

a plot of schedules over time for the list of channels; and one or more indicators of transition windows overlaid as a bar overlapping each of the channels in the plot, each transition window being selectable such that detailed information for the transition window is displayed.

10. The display of claim 9, wherein, via the GUI, a user selects a multiplex from the drop-down menu so that the application retrieves schedule information for the plurality of channels included in the multiplex.

11. The display of claim 10, wherein the schedule information is retrieved for a duration of time corresponding to a lookahead window included in configuration information for the application, wherein the plot of schedules over time includes the duration of the lookahead window on a time axis.

12. The display of claim 11, wherein the one or more indicators of transition windows overlaid on the plot have a minimum width along the time axis corresponding to a minimum transition window size included in configuration information for the application.

13. The display of claim 9, wherein the plot includes types of content to be transmitted over time for each of the plurality of channels, wherein first segments on the plot corresponding to a first type of content are displayed as a first color and second segments on the plot corresponding to a second type of content are displayed as a second color.

14. The display of claim 13, wherein the first type of content comprises commercial content and the second type of content comprises non-commercial content.

15. The display of claim 9, further comprising:

information for a first transition window including a start time, an end time, and a duration of the first transition window when the first transition window is selected via the GUI.

16. The display of claim 9, wherein the indicator of the one or more transition windows comprises, for each transition window, the bar overlaid on the plot of the schedule information having a thickness corresponding to the duration of the transition window.

17. The display of claim 16, wherein the schedules include a first type of content and a second type of content to be displayed on the channels, wherein the plot includes first segments corresponding to the first type of content and second segments corresponding to the second type of content, and wherein the bar overlaid on the plot overlaps only second segments across each of the channels.

18. The display of claim 17, wherein the bar has a width corresponding to a duration along a time axis for which only second segments are scheduled across each of the channels.

19. The display of claim 9, wherein the bar semi-transparently overlaps the plot of schedules.

* * * * *